(12) United States Patent
Hayashi

(10) Patent No.: US 6,600,115 B2
(45) Date of Patent: Jul. 29, 2003

(54) SWITCHING DEVICE

(75) Inventor: Hirofumi Hayashi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/144,865

(22) Filed: May 15, 2002

(65) Prior Publication Data

US 2002/0171366 A1 Nov. 21, 2002

(30) Foreign Application Priority Data

May 17, 2001 (JP) ..................................... P2001-147686

(51) Int. Cl.[7] ................................................. H01H 1/14
(52) U.S. Cl. ....................... 200/239; 200/237; 200/244; 200/279; 200/291; 200/332
(58) Field of Search ............................. 315/77, 82, 83; 200/61.27, 61.54, 237–239, 244, 259, 286, 276, 290, 325, 279, 291, 299, 336, 316, 322, 332, 335; 307/10.1

(56) References Cited

U.S. PATENT DOCUMENTS

| | | | | |
|---|---|---|---|---|
| 4,315,117 A | * | 2/1982 | Kokubu et al. | ........... 200/61.27 |
| 4,328,431 A | * | 5/1982 | Usami | ........................ 307/10.1 |
| 5,047,600 A | * | 9/1991 | Enari et al. | .............. 200/61.54 |
| 5,665,948 A | * | 9/1997 | Oikawa | .................... 200/61.54 |

* cited by examiner

*Primary Examiner*—Haissa Philogene
(74) *Attorney, Agent, or Firm*—Morgan, Lewis & Bockius LLP

(57) ABSTRACT

A rod (40) is pivotally provided in a lever (28). The rod (40) is divided into a small-diameter lower rod (37) and a large-diameter upper rod (38). When a knob (45) is pivotally moved, the lower rod (37) and the upper rod (38) are moved in an integrated fashion. A movable contact (31) is slid by means of movement of a pusher (57) of the lower rod (37). In this case, the rigidity of the upper rod (38) is improved, and hence the upper rod (38) becomes less susceptible to deflection induced by the load of the spring (53). Accordingly, inclination of the knob (45) toward the lever (28) is prevented, and hence a clearance between the lever (28) and the knob (45) can be maintained constant by means of a single set consisting of a spring (53) and a moderation ball (54).

5 Claims, 5 Drawing Sheets

SWITCHING DEVICE

BACKGROUND OF THE INVENTION

The present invention relates to a switching device in which a rod is pivotally attached into a rod case.

The configuration of a related-art switching device will be described with reference to FIGS. 4 and 5. As shown in FIG. 5, a rod case 1 has the shape of a cylinder having openings at respective ends thereof. As shown in FIG. 4, a rod 3 is rotatably inserted into a cylindrical portion 2 of the rod case 1. A knob 4 is rotatably fitted to the right end of the rod case 1 and connected to the rod 3 through a pin 5.

Two sets, each set comprising a compression spring 6 and a moderation member 7, are attached to the knob 4 (only one set is illustrated). The moderation members 7 are pressed against a detent plate 8 under the force of the springs 6. The detent plate 8 is fastened to the rod case 1, and the knob 4 is selectively held in one of a plurality of control positions as a result of selective engagement of the moderation members 7 with a plurality of indentations 9 (see FIG. 5) of the detent plate 8 under the force of the springs 6.

A control portion 10 is formed at the left end of the rod 3, and a contact holder 11 is engaged with the control portion 10. A movable contact 12 is held by the contact holder 11. When the knob 4 is turned, the control portion 10 is rotated integrally with the rod 3, thereby sliding a movable contact 12. The movable contact 12 is selectively brought into electrical connection with any one of stationary contacts.

As shown in FIG. 5, the rod 3 is inserted in to the cylindrical portion 3 of the rod case 1 from the left side. Hence, the size of the rod 3 is limited by the internal diameter of the cylindrical portion 3. When an attempt is made to employ only one set consisting of the spring 6 and the moderation member 7, the portion of the rod 3 close to the moderation member 7 becomes deflected under the force of the spring 6, as designated by a two-dot chain line shown in FIG. 4. As a result, the knob 4 is inclined toward the rod case 1, so that the clearance between the rod case 1 and the knob 4 becomes greater in portion A and smaller in portion B. Hence, use of one set consisting of the spring 6 and the moderation member 7 is not sufficient.

SUMMARY OF THE INVENTION

The present invention has been conceived in light of the foregoing circumstances and aims at providing a switching device capable of holding constant a clearance between a rod case and a knob by means of one set consisting of a spring and a moderation member.

In order to solve the aforesaid object, the invention is characterized by having the following arrangement.

(1) A switching device comprising:
  a cylindrical rod case opened at opposite ends thereof;
  a rod rotatably provided in the rod case, the rod including,
    a first rod including a control portion for actuating a movable contact, and
    a second rod including a knob for actuating the rod and having a diameter larger than a diameter of the first rod, wherein the first and second rods are engaged with each other within the rod case;
  a moderation surface including a plurality of indentations and provided in the rod case; and
  a moderation member and a spring which are provided in the second rod, wherein the moderation member is selectively engaged with any one of the plurality of indentations on the moderation surface under force of a spring according to a pivotal movement of the knob.

(2) The switching device according to (1), wherein
  the second rod is provided with a large-diameter portion to which the knob is fitted in an axial direction of the second rod,
  the first and second rods are provided with rod engagement portions which are engaged each other when the first and second rods are inserted into the rod case from opposite ends thereof, respectively, and
  the knob and the large-diameter portion are provided with knob engagement portions which are engaged each other when the knob is fitted to the large-diameter portion in the axial direction.

(3) The switching device according to (2), wherein
  the control portion and the rod engagement portion are formed at opposite ends of the first rod, respectively, and
  the large-diameter portion and the rod engagement portion are formed at opposite ends of the second rod, respectively, and
  the control portion and the large-diameter portion are exposed to the exterior of the rod case when the rod engagement portions are engaged each other.

(4) The switching device according to (2), wherein
  one of the rod engagement portions includes a rail groove extending in the axial direction,
  the other of the rod engagement portions includes a rail extending in the axial direction, and
  when the rod engagement portions are engaged each other, the rail groove is engaged with the rail so as to prevent positional displacement in a circumferential direction of the rod between the first and second rods.

(5) The switching device according to (2), wherein
  one of the knob engagement portions includes a rail groove extending in the axial direction,
  the other of the rod engagement portions includes a rail extending in the axial direction, and
  when the knob engagement portions are engaged each other, the rail groove is engaged with the rail so as to prevent position displacement in a circumferential direction of the rod between the second rod and the knob.

DETAILED DESCRIPTION OF PREFERRED EMBODIMENTS

An embodiment of the invention will be described with reference to FIGS. 1 through 3. The present embodiment corresponds to application of the invention to a lever combination switching device which switches the states of a turn signal light and a headlight of an automobile.

Figure 3:
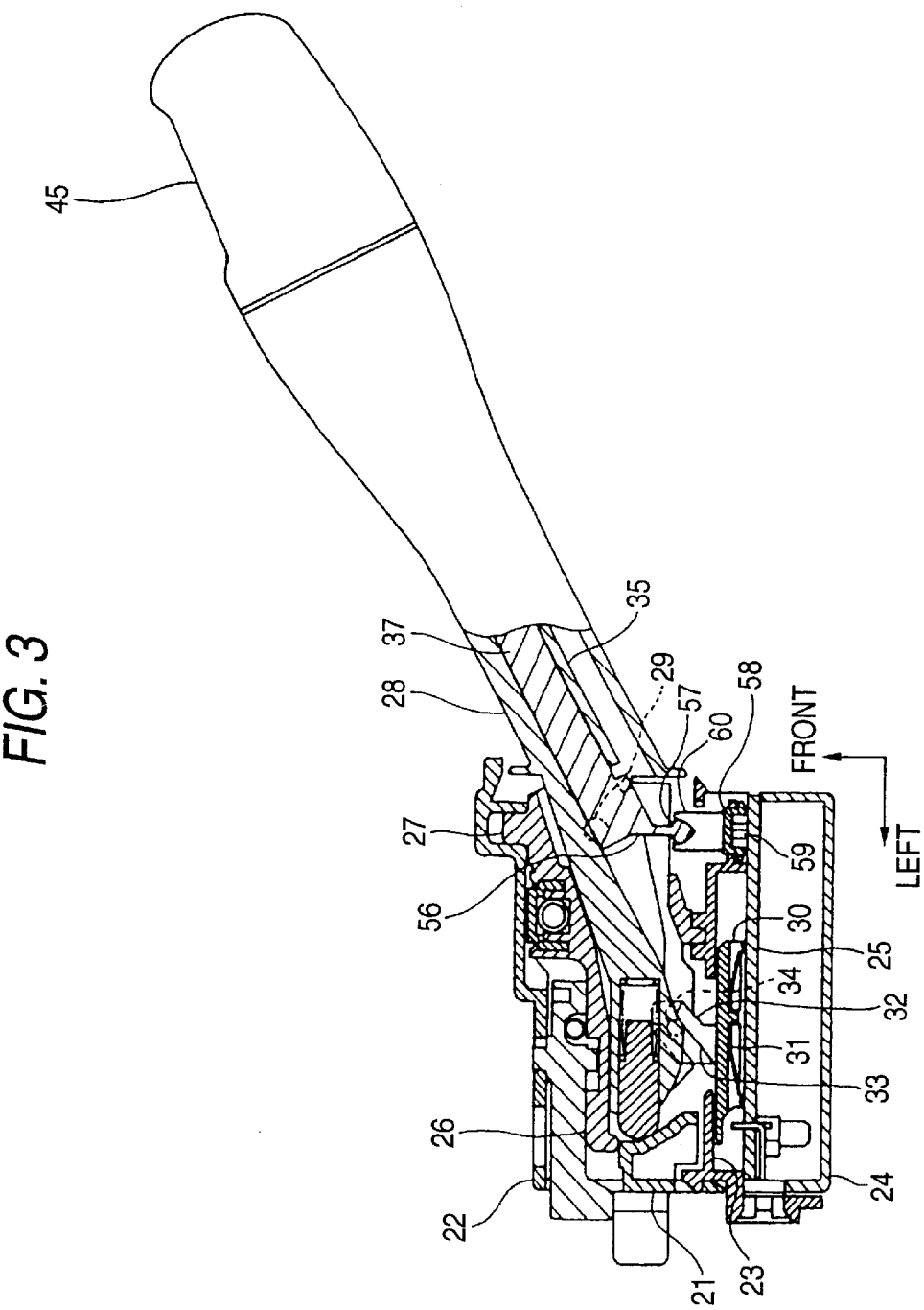
FIG. 3 is a cross-sectional view showing the overall configuration of the lever.
Figure 4:
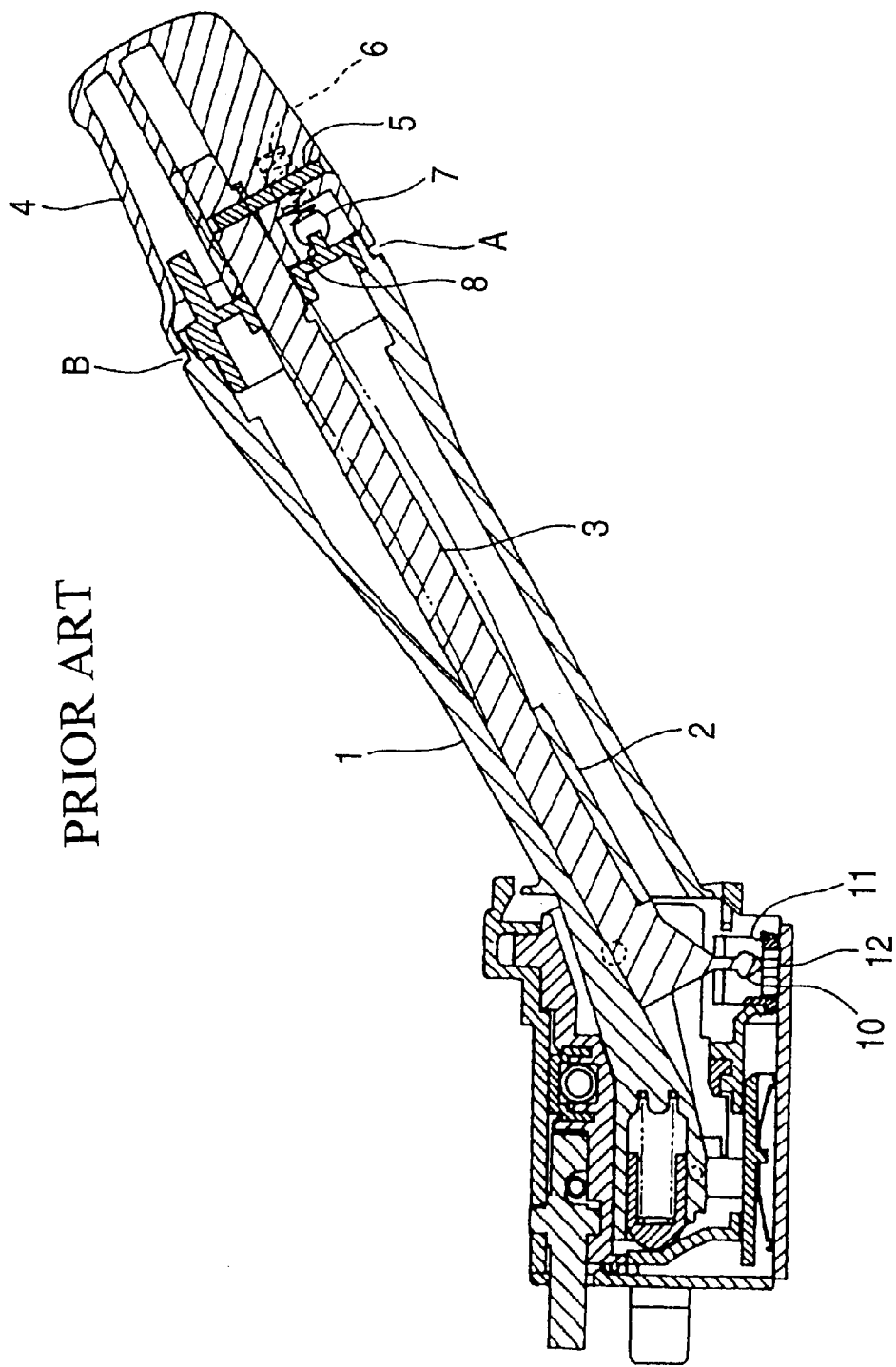
FIG. 4 corresponds to FIG. 3, showing an example related-art lever.
Figure 5:
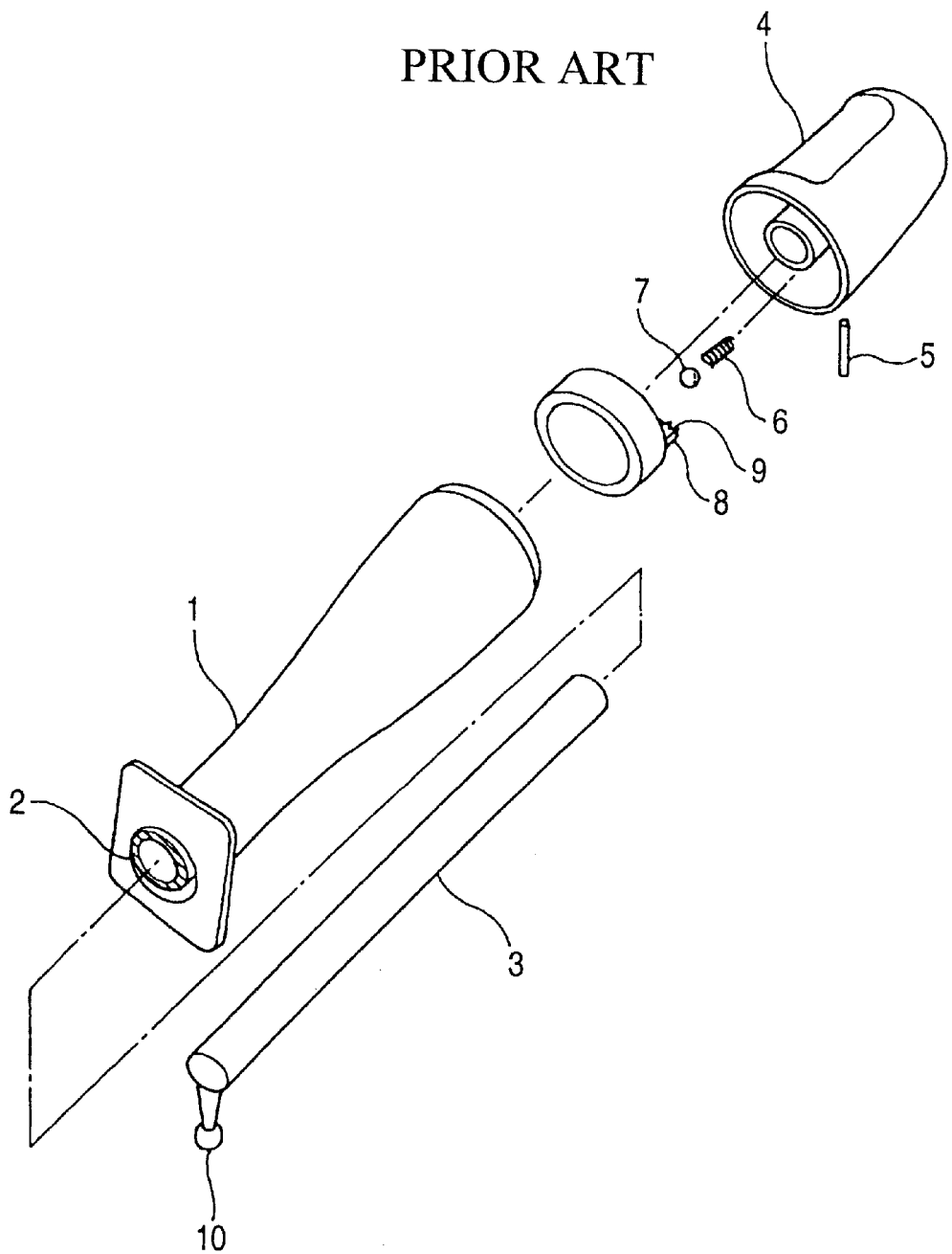
FIG. 5 corresponds to FIG. 2, showing an example related-art lever.

As shown in FIG. 3, a switch case 21 is formed of synthetic resin into the shape of an angular cylinder which is open at the front and rear thereof. A front cover 22 made of synthetic resin is attached to the front surface of the switch case 21. A rear cover 23 made of synthetic resin is attached to the rear surface of the switch case 21. Aboard case 24 made of synthetic resin is fastened to the rear cover 23. A printed wiring board 25 (i.e., a PC board 25) is held in the board case 24.

A bracket 26 is attached into the switch case 21 so as to be vertically rotatable about a shaft 27. A lever 28 made of synthetic resin is attached into the bracket 26 so as to be rotatable, in the forward and backward directions, about a shaft 29. Here, the lever 28 corresponds to a rod case. When the lever 28 is actuated around the shaft 29, the lever 28 is solely turned. When the lever 28 is actuated around the shaft 27, the lever 28 is turned integrally with the bracket 26.

A contact holder 30 made of synthetic resin is slidably housed in a space between the rear cover 23 and the PC board 25. A movable contact 31 made of a leaf spring is held on the back of the contact holder 30. A pair of plates 32 are formed integrally with the front surface of the contact holder 30 so as to become vertically separated from each other by an interval (only one plate 32 is illustrated). An inclined guide groove 33 is formed in each plate 32.

A pin 34 is slidably inserted into each of the plates 32 of the contact holder 30. The pins 34 are formed integrally with the lever 28. When the lever 28 is actuated back and forth, the interior surfaces of the respective guide grooves 33 are pressed by the pins 34. As a result, the contact holder 30 is slid right or left. When the lever 28 is actuated vertically, the contact holder 30 is slid vertically.

A plurality of turn signal contacts (not shown) are fastened to the front surface of the PC board 25. The turn signal contacts constitute the turn signal switch along with the movable contact 31. When the lever 28 is actuated vertically, the lever 28 is selectively brought into electrical connection with the turn signal switch through the movable contact 31.

A pair of dimmer contacts (not shown) are fastened to the front surface of the PC board 25. The dimmer contacts constitute a dimmer passing switch along with the movable contact 31. As a result of the lever 28 being turned forward, the lever 28 is brought into electrical connection with the dimmer passing switch through the movable contact 31.

Figure 1:
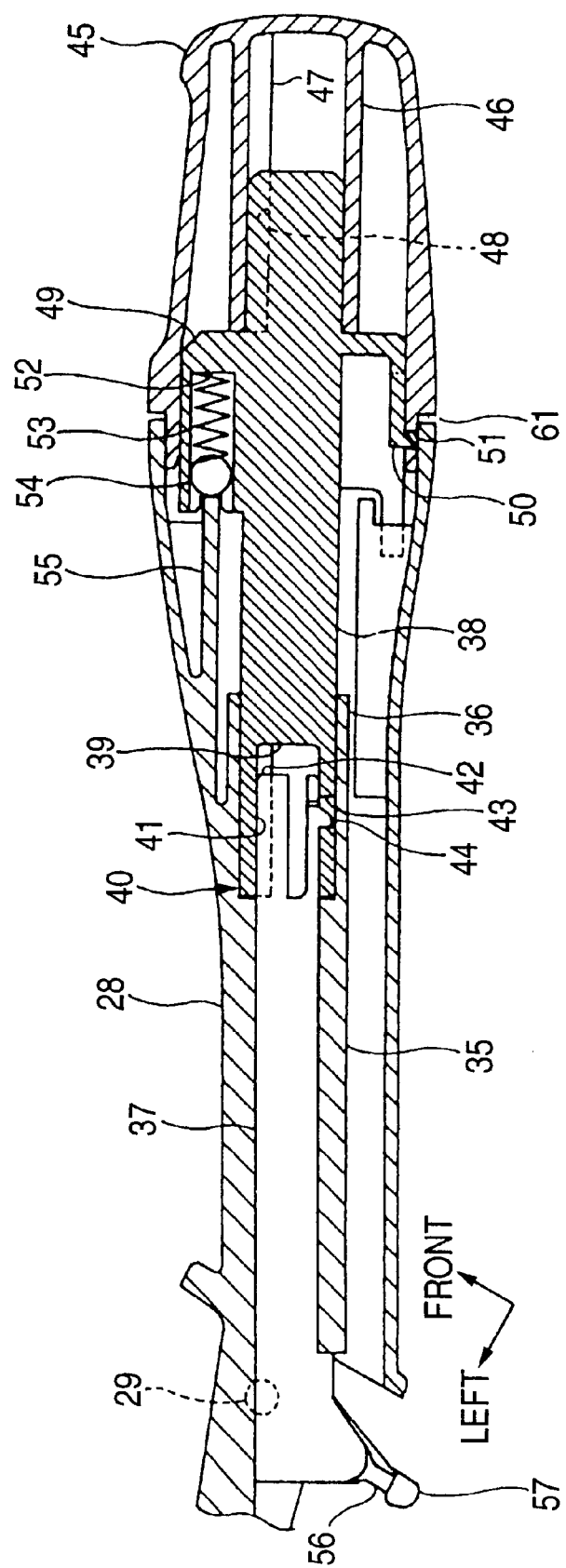
FIG. 1 is a view showing an embodiment of the invention (i.e., a cross-sectional view showing an internal configuration of a lever)
Figure 2:
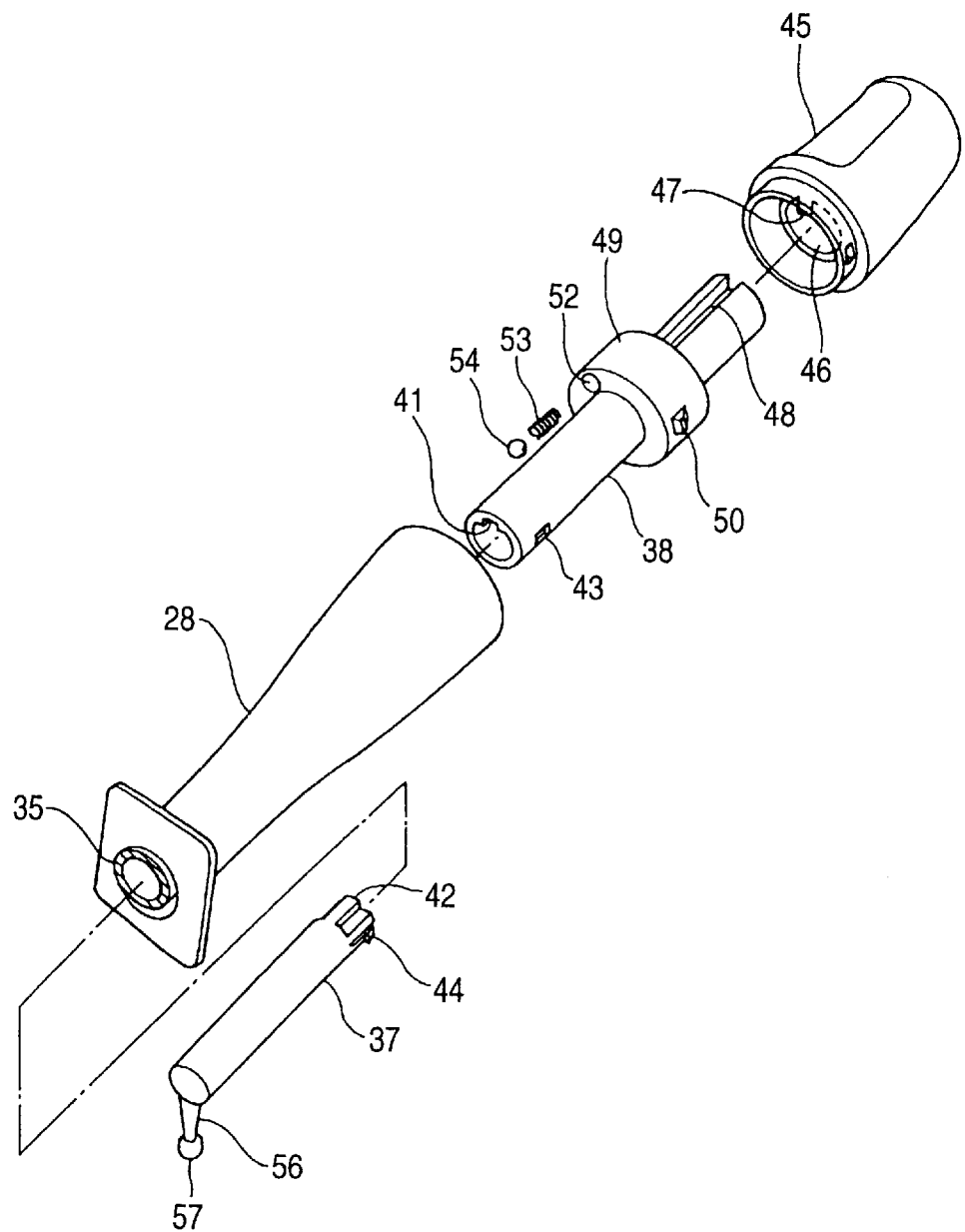
FIG. 2 is a perspective exploded view of the internal configuration of the lever.

As shown in FIG. 1, a small-diameter cylindrical portion 35 and a large-diameter cylindrical portion 36 are formed integrally in the lever 28. A columnar lower rod 37 made of synthetic resin is rotatably fitted into the large-diameter cylindrical portion 36. A circular recess 39 is formed in the left end of an upper rod 38. The right end of the lower rod 37 is fitted into the recess 39. The lower rod 37 corresponds to a first rod, and the upper rod 38 corresponds to a second rod. Reference numeral 40 designates a rod constituted of the lower rod 37 and the upper rod 38.

A rail groove 41 corresponding to a rod engagement portion is formed in the right end of the lower rod 37. A rail 42 corresponding to a rod engagement portion is engaged in the rail groove 41. The rail 42 is formed integrally with the upper rod 38, and the lower rod 37 and the upper rod 38 are joined together so as not to involve positional displacement in the circumferential direction, by means of the engaging force developing in the rail groove 41 and the rail 42.

An engagement hole 43 corresponding to the rod engagement portion is formed in the left end of the upper rod 38. A claw portion 44 corresponding to the rod engagement portion is engaged with the engagement hole 43. The claw portion 44 is formed integrally with the lower rod 37, and the lower rod 37 and the upper rod 38 are joined together so as to prevent positional displacement in a circumferential direction, by means of the engaging force developing in the engagement hole 43 and the claw 44.

A sleeve portion 46 of the knob 45 is fitted to the right end of the upper rod 38. A rail 47 corresponding to a knob engagement portion is formed integrally with the interior circumferential surface of the sleeve portion 46. The rail 47 is engaged with the inside of a rail groove 48 corresponding to the knob engagement portion. The rail groove 48 is formed in the upper rod 38. The upper rod 38 and the knob 45 are joined together so as not to involve positional displacement in a circumferential direction, by means of the engaging force developing in the rail 47 and the rail groove 48. Here, the knob 45 is formed from synthetic resin.

A rotor 49 corresponding to a large diameter portion is formed integrally with the upper rod 38, and the knob 45 is fitted to an exterior circumferential surface of the rotor 49. A claw portion 50 corresponding to the knob engagement portion is formed integrally with the rotor 49. An engagement hole 51 is formed in the knob 45. The claw portion 50 is engaged with the engagement hole 51 corresponding to the knob engagement portion. The knob 45 and the upper rod 38 are joined together so as not to involve axial detachment, by means of the engaging force developing between the engagement hole 51 and the claw portion 50.

A recess 52 is formed in the rotor 49, and a compression coil spring 53 and a moderation ball 54 are housed in the recess 52. A detent plate 55 is formed integrally with the lever 28. The moderation ball 54 is pressed to the right end surface of the detent plate 55 by means of the restoration force of the spring 53. A plurality of indentations (not shown) are formed in the right end surface of the detent plate 55 so as to become spaced an interval apart from each other in the circumferential direction. The knob 45 is selectively held in any one of the plurality of control positions as a result of the moderation ball 54 being selectively engaged with any one of the plurality of indentations by means of the restoration force of the spring 53. Here, the moderation ball 54 corresponds to a moderation member, and the right end surface of the detent plate 55 corresponds to a moderation surface.

An arm 56 is formed integrally with the left end portion of the lower rod 37. A ball-shaped pusher 57 corresponding to the control portion is formed integrally with the extremity of the arm 56. At the time of actuation of the knob 45, the upper rod 38 and the lower rod 37 are integrally turned with the knob 45 about the axial line, so that the pusher 57 is moved vertically.

As shown in FIG. 3, a contact holder 58 made of synthetic resin is attached to the right end portion of the rear cover 23 so as to be slidable vertically. A movable contact 59 made of a leaf spring is held in the contact holder 58. Plates 60 are formed integrally with the upper and lower ends of the contact holder 58 (only one plate 60 is illustrated). The pusher 57 is engaged between the plates 60. When the knob 45 is actuated, the pusher 57 presses the plates 60, thereby causing the contact holder 58 and the movable contact 59 to slide vertically.

A plurality of rear wiper contacts (unillustrated) are fastened to the front surface of the PC board 25. The rear wiper contacts constitute a rear wiper switch in conjunction with the movable contact 59. The knob 45 is selectively pivoted to any one of the plurality of control positions and selectively brought into electrical connection with the rear wiper switch through the movable contact 59 of the contact holder 58.

Procedures for assembling the switching device will now be described. First, the right end portion of the lower rod 37 is fitted in the small-diameter cylindrical portion 35 from the left. The spring 53 and the moderation ball 54 are accommodated in the recess 52 of the rotor 49. The left end of the upper rod 38 is fitted in the large-diameter cylindrical portion 36 of the lever 28 from the right. The rail 42 of the upper rod 38 is engaged with the inside of the rail groove 41 of the lower rod 37. The claw portion 44 of the lower rod 37 is engaged with the engagement hole 43 of the upper rod 38. The lower rod 37 and the upper rod 38 are joined together.

After the lower rod 37 and the upper rod 38 is joined together, the cylindrical portion 46 of the knob 45 is fitted to an outer circumferential surface of the upper rod 38. The rail 47 of the knob 45 is then engaged with the inside of the rail groove 48 of the upper rod 38. The claw portion 50 of the upper rod 38 is engaged with the inside of the engagement hole 51 of the knob 45, so that the upper rod 38 and the knob 45 are joined together.

In the embodiment, the rod 40 is divided into the small-diameter lower rod 37 having the pusher 57 and the large-diameter upper rod 38 for the moderation ball 54. Of the rod 40, the upper rod 38 for the moderation ball 54 is improved in rigidity. Hence, the rod 40 becomes less susceptible to deflection induced by the load of the spring 53. Accordingly, inclination of the knob 45 toward the lever 28 is prevented, and a clearance 61 between the lever 28 and the knob 45 can be maintained constant by means of the set consisting of the spring 53 and the moderation ball 54. The restoration force of the spring 53 acts directly on the upper rod 38 without involvement of the knob 45. Even in this regard, inclination of the knob 45 is prevented.

The rail 42 of the upper rod 38 is axially fitted to the rail groove 41 of the lower rod 37. The claw portion 44 is axially fitted to the engagement hole 43. The rail groove 48 of the upper rod 38 is axially fitted to the rail 47 of the knob 45. The claw portion 50 is axially fitted to the engagement hole 51. In this way, all the assembly operations can be performed by axial movement, thereby improving the ease of assembly.

The detent plate 55 is formed integrally with the lever 28. Hence, the lever 28 can be used for a switching device of different type by means of replacing a moderation surface. Thus, application of the lever 28 to switches of different types becomes simple.

In the embodiment, the invention is applied to a lever combination switching device to be used for actuating a turn signal light and a headlight of an automobile, but the invention is not limited to the embodiment. For instance, the invention may be applied to a lever combination switching device to be used for actuating a front wiper motor and a rear wiper motor.

According to the switching device of the invention, the rod is divided into a small-diameter first rod having a control portion, and a large-diameter second rod for a moderation member. Hence, the rod for the moderation member is improved in rigidity. Hence, the rod becomes less susceptible to deflection induced by the load of the spring; consequently, inclination of the knob to the rod case is prevented, and a clearance between the rod case and the knob can be maintained constant by means of a single set consisting of the spring and the moderation member.

What is claimed is:

1. A switching device comprising:
   a cylindrical rod case opened at opposite ends thereof;
   a rod rotatably provided in the rod case, the rod including,
      a first rod including a control portion for actuating a movable contact, and
      a second rod including a knob for actuating the rod and having a diameter larger than a diameter of the first rod, wherein the first and second rods are engaged with each other within the rod case;
   a moderation surface including a plurality of indentations and provided in the rod case; and
   a moderation member and a spring which are provided in the second rod, wherein the moderation member is selectively engaged with any one of the plurality of indentations on the moderation surface under force of a spring according to a pivotal movement of the knob.

2. The switching device according to claim 1, wherein
   the second rod is provided with a large-diameter portion to which the knob is fitted in an axial direction of the second rod,
   the first and second rods are provided with rod engagement portions which are engaged each other when the first and second rods are inserted into the rod case from opposite ends thereof, respectively, and
   the knob and the large-diameter portion are provided with knob engagement portions which are engaged each other when the knob is fitted to the large-diameter portion in the axial direction.

3. The switching device according to claim 2, wherein
   the control portion and the rod engagement portion are formed at opposite ends of the first rod, respectively, and
   the large-diameter portion and the rod engagement portion are formed at opposite ends of the second rod, respectively, and
   the control portion and the large-diameter portion are exposed to the exterior of the rod case when the rod engagement portions are engaged each other.

4. The switching device according to claim 2, wherein
   one of the rod engagement portions includes a rail groove extending in the axial direction,
   the other of the rod engagement portions includes a rail extending in the axial direction, and
   when the rod engagement portions are engaged each other, the rail groove is engaged with the rail so as to prevent positional displacement in a circumferential direction of the rod between the first and second rods.

5. The switching device according to claim 2, wherein
   one of the knob engagement portions includes a rail groove extending in the axial direction,
   the other of the rod engagement portions includes a rail extending in the axial direction, and
   when the knob engagement portions are engaged each other, the rail groove is engaged with the rail so as to prevent position displacement in a circumferential direction of the rod between the second rod and the knob.

* * * * *